United States Patent [19]

Iwakiri et al.

[11] Patent Number: 5,206,809
[45] Date of Patent: Apr. 27, 1993

[54] HEAT MEASURING SYSTEM FOR DETECTING KNOCK IN INTERNAL COMBUSTION ENGINE

[75] Inventors: Yasunori Iwakiri, Kanagawa; Yoshihisa Sugimoto, Shizuoka, both of Japan

[73] Assignee: Nissan Motor Company, Limited, Yokohama, Japan

[21] Appl. No.: 866,123

[22] Filed: Apr. 7, 1992

Related U.S. Application Data

[63] Continuation of Ser. No. 576,582, Sep. 4, 1990, abandoned.

[30] Foreign Application Priority Data

Sep. 4, 1989 [JP] Japan .................. 1-230145

[51] Int. Cl.⁵ .................. F02P 5/15; F02P 5/12; F02P 5/14
[52] U.S. Cl. .................. 364/431.08; 123/406; 123/425; 73/116
[58] Field of Search .................. 364/431.03, 431.04, 364/431.07, 431.08; 73/116, 117.3; 123/406, 418, 421, 425, 435

[56] References Cited

U.S. PATENT DOCUMENTS

| | | | |
|---|---|---|---|
| 4,538,454 | 9/1985 | Aono | 73/117.3 X |
| 4,622,939 | 11/1986 | Matekunas | 123/425 |
| 4,802,454 | 2/1989 | Tanaka | 123/425 |
| 4,905,648 | 3/1990 | Washino et al. | 364/431.08 X |
| 4,976,241 | 12/1990 | Ishida et al. | 73/117.3 X |

Primary Examiner—Parshotam S. Lall
Assistant Examiner—Edward Pipala
Attorney, Agent, or Firm—Foley & Lardner

[57] ABSTRACT

A knock detecting system for internal combustion engines which includes a heat quantity computing unit for deriving a heat quantity produced in every engine cycle, on the basis of the fluctuations in a combustion pressure waveform in which high-frequency components having frequencies higher than a predetermined cut-off frequency being removed from a fluctuation waveform of detected combustion pressure. The knock detecting system also includes a knock intensity computing units which derives knock intensity on the basis of a ratio of a heat quantity produced by knocking to a heat quantity produced by normal combustion.

10 Claims, 15 Drawing Sheets

P(X)P(I+1)
V(X)V(I+1)

HEAT MEASURING SYSTEM FOR DETECTING KNOCK IN INTERNAL COMBUSTION ENGINE

This application is a continuation of application Ser. No. 07/576,582, filed Sep. 4, 1990 now abandoned.

BACKGROUND OF THE INVENTION

1. Field of the Invention

The present invention relates generally to a knock detecting system for internal combustion engines. More specifically the invention relates to a knock detecting system which can determine knock intensity on the basis of heat quantities produced in the combustion chamber of the engine.

2. Description of the Background Art

Since electronic control techniques have been widely used for vehicle and engine controls, a variety of methods for decreasing and controlling knocking in internal combustion engines have been used. In conventional methods, knocking is decreased by improving the shapes of combustion chambers, gas flows in the combustion chambers or the like, or by increasing the octane number of the fuel used. In recent years, in addition to the aforementioned conventional methods, a new knock control technique, which can be used in unmodified stock cars, has been proposed. In the proposed technique, knocking control is performed by causing the spark ignition timing to approach the limit at which slight knocking, undetectable to human ears, occurs, so that improved fuel consumption and power performance can be obtained under all driving conditions, regardless of a difference between fuel characteristics and/or a change of octane number required for the engine with the passage of time.

In recent years, a system has been proposed in which this new knock detecting technique is used on respective cylinders of a 6-cylinder internal combustion engine. In addition, in on-board knock control systems using electronic control, knock detection and quantitative processing techniques are important.

Methods for detecting knocking, which can be used for automotive vehicles, are classified by detected physical quantities. In such methods, there are various methods which utilize pressure in engine cylinders vibration of the engine, combustion light produced in the combustion chamber, noise level, ion current in engine cylinders, and so forth.

Among the aforementioned methods, one typical conventional knock detecting system for internal combustion engines is described in, for example, "Automobile Technique, 1986, Vol. 40, No. 11". This system detects high-frequency components near a knock frequency by fluctuation in a pressure waveform in the combustion chamber on the basis of output from a cylinder pressure sensor mounted on an ignition plug, assigning numerical values to the intensities of the high-frequency components of the fluctuation waveform for determining knock level using a statistical process.

However, in this and other conventional knock detecting systems for internal combustion engines, a logic used for knock detection must be adjusted for respective types of engines, since the fluctuation detected by the cylinder pressure sensor is influenced by mounting position, the type of sensor, and which cylinder the detection occurs in. As a result, there is a disadvantage in that man-hours and costs are increased. In addition, when the adjustment of logic for knock detection does not exactly meet engine requirements, there is a disadvantage in that the accuracy of knock detection is decreased.

To use cylinder pressure sensors for conventional knock detecting methods is very effective since the engine requires no special processing. However, in case a where a knock detecting method uses high-frequency components of signals output from a sensor, it is difficult to separate a noise component from the output signals, since the output signals do not include only combustion pressure, but also vibration of the engine itself and mechanical vibration caused by rotation. Therefore, there is a disadvantage in that normal knock components can not be accurately detected. Thus, sufficient accuracy in knock detection can not be obtained. For example, when engine speed becomes high, fluctuation in the high-frequency components of the cylinder pressure increase, in such case it becomes particularly difficult to separate knock components from other signal components.

SUMMARY OF THE INVENTION

It is therefore a principal object of the present invention to provide an improved knock detecting system which has higher accuracy than conventional systems.

It is another object of the invention to provide a system which can accurately detect knocking regardless of the types of engine and sensor, without changing the knock detecting logic even if the system is used for different types of engine.

In order to accomplish the aforementioned and other objects, a knock detecting system for internal combustion engines includes heat quantity computing means for deriving a heat quantity produced at every engine cycle on the basis of a fluctuation waveform in combustion pressure in which high-frequency components having frequencies higher than a predetermined cut-off frequency are removed from a detected fluctuation waveform. The knock detecting system also includes a knock intensity computing means for deriving knock intensity on the basis of a relationship between a heat quantity produced by knocking and a total heat quantity produced in every engine cycle.

According to one aspect of the present invention, a knock detecting system for internal combustion engines comprises:

pressure detecting means for monitoring fluctuation in pressure within the combustion chamber of an engine cylinder of the engine, to produce a first signal indicative of the fluctuation;

removing means for removing high-frequency components having frequencies higher than a predetermined cut-off frequency from the first signal, to output a second signal wherein the high-frequency components from the first signal are removed;

running condition detecting means for monitoring a running condition of the engine to produce a third signal;

total heat quantity computing means for deriving a total heat quantity produced in every engine cycle, on the basis of the second and third signals;

setting means for setting a range in which knocking occurs;

knock heat quantity computing means for deriving a knock heat quantity generated in the preset knocking range in every engine cycle, on the basis of the second and third signals; and knock intensity determining means for determining knock intensity on the basis of a relationship between the knock heat quantity and the total heat quantity.

The knock intensity determining means may derive a ratio of the knock heat quantity to the total heat quantity to determine knock intensity on the basis of this ratio. Alternatively, the knock intensity determining means may also derive a ratio of the knock heat quantity to a normal combustion heat quantity generated by normal combustion, to determine knock intensity on the basis of this ratio, the normal combustion heat quantity being obtained by subtracting the knock heat quantity from the total heat quantity. The running condition detecting means may include crank angle detecting means for monitoring angular position of a crankshaft of the engine to produce a crank angle indicative signal. The setting means may set a knock starting-point at which heat by knocking starts to be produced, and a knock end-point at which heat ceases to be produced by knocking. Preferably, the knock starting-point is an inflection point of the total heat quantity relative to the angular position of the crankshaft, and the knock end-point is a point in which the total heat quantity becomes zero. Alternatively, the angular position of the crankshaft in the knock starting-point may be near top-dead-center, and the angular position thereof in the knock end-point may be 50° after top-dead-center. The pressure detecting means is preferably a cylinder pressure sensor. The predetermined cut-off frequency may be set so as to vary in proportion to the engine speed which may be derived on the basis of the angular position of the crankshaft. The removing means may include a filter selecting circuitry which selects the optimum cut-off frequency on the basis of the angular position, and a high-frequency cut-off filter which cuts off high-frequency components having frequencies higher than the selected cut-off frequency.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
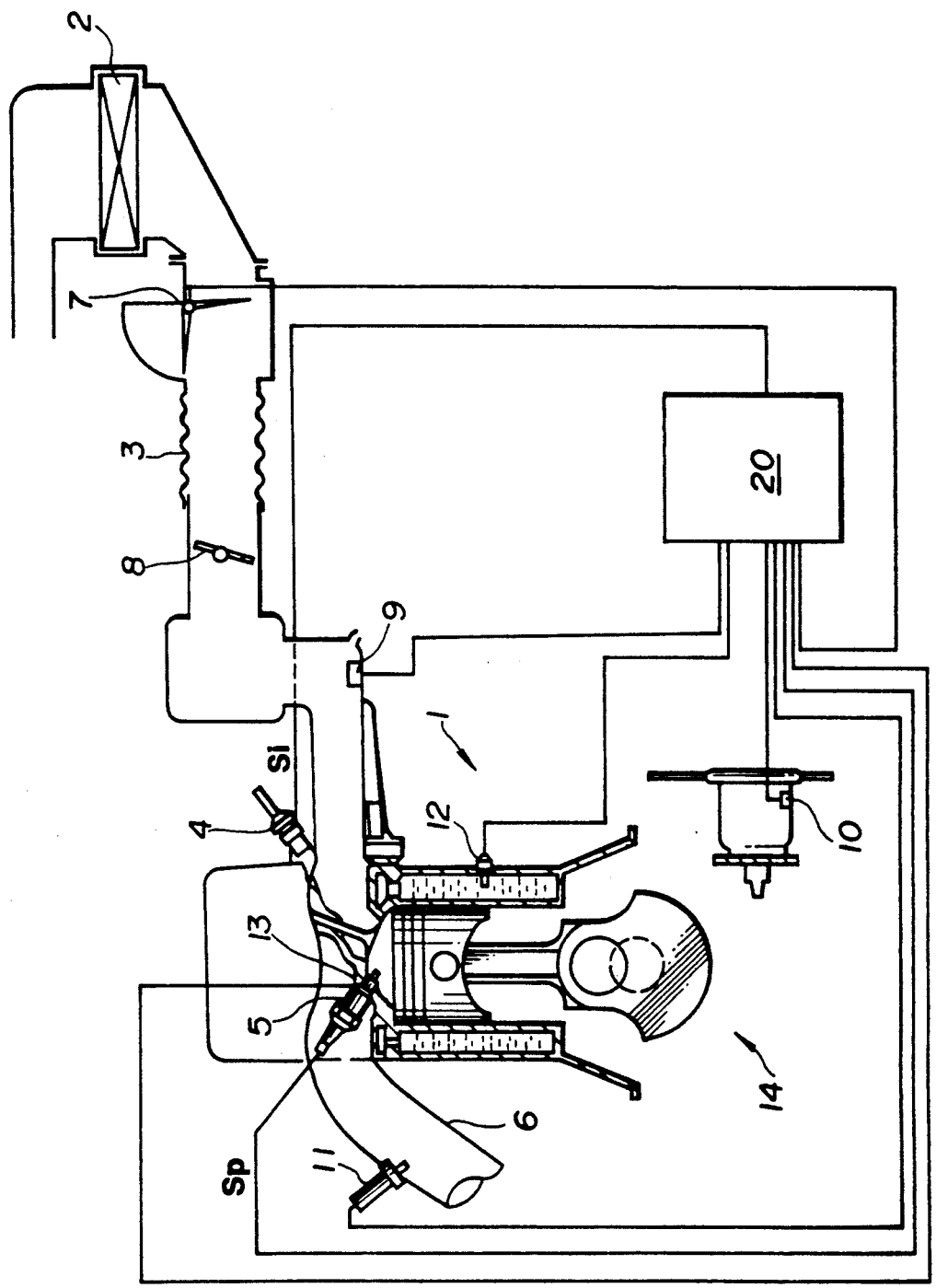
FIG. 1 is a schematic view of an ignition control system, to which the preferred embodiments of a knock detecting system for internal combustion engines, according to the present invention, can be applied.

Referring now to the drawings, particularly to FIG. 1, there is shown an ignition timing control system, to which the preferred embodiments of a knock detecting system for internal combustion engines, according to the present invention, can be applied.

In this embodiment, internal combustion engine 1 has a plurality of cylinders. Intake air is introduced into the respective cylinders of the internal combustion engine 1 from an air cleaner 2 through an intake pipe 3, and fuel is injected into the respective cylinders by means of an injector 4 on the basis of an injection control signal Si, so that the intake air and fuel are mixed with each other to form an air/fuel mixture in respective cylinders. The air/fuel mixture is exploded and burned in the respective cylinders due to electrical discharge from an ignition plug 5 on the basis of an ignition control signal Sp, and exhaust gas is discharged from an exhaust pipe 6.

The knock detecting system has various sensor means, such as an air flow meter 7, an intake pressure sensor 9, crank angle sensors 10, an oxygen ($O_2$) sensor 11, an engine coolant temperature sensor 12 and cylinder pressure sensors 13.

The air flow meter 7 is provided for monitoring an intake air flow rate representative of engine load to produce an intake air flow rate indicative signal Qa. The air flow rate Qa is controlled by means of a throttle valve 8 installed within the intake pipe 3. The intake pressure sensor 9 is provided for monitoring a degree negative intake pressure present in the intake pipe 3 to produce a negative intake pressure indicative signal. The crank angle sensor serving as crank angle detecting means 10 is provided for monitoring angular position of a crankshaft to produce a crank reference signal $\theta ref$ at every predetermined angular position, e.g. every 70° BTDC (before top-dead-center) position, of the crankshaft, and a crank position signal $\theta pos$ at every given angular displacement, e.g. 1°. The crank angle sensor 10 is disposed within an engine accessory, such as a distributor, which rotates synchronously with engine revolution for monitoring the crankshaft angular position. By counting output pulses of the crank angle sensor 10, the engine speed N may be derived.

The oxygen sensor 11 is disposed within the exhaust pipe 6 for monitoring an oxygen concentration contained in the exhaust gas to produce an $O_2$ signal. The engine coolant temperature sensor 12 is disposed within an engine coolant passage, i.e. a water jacket, for monitoring temperature of engine coolant passing through the engine coolant passage to produce an engine coolant temperature indicative signal TW. The cylinder pressure sensors 13, serving as cylinder pressure detecting means, are provided for monitoring combustion pressure (cylinder pressure) in the respective cylinders to produce detection signals (voltage signals) corresponding to the pressure in each cylinder. Each of the cylinder pressure sensors 13 may be, for example, clamped between mounting surfaces of the ignition plug 5 provided in each cylinder. Other cylinder pressure detecting means, which may produce signals varying in proportion to the combustion pressure produced by fuel combustion, may be substituted for the cylinder pressure sensors 13. For example, a pressure sensitive device installed in the ignition plug 5 may be substituted for a cylinder pressure sensor.

The air flow meter 7, the intake pressure sensor 9, the crank angle sensor 10, the oxygen sensor 11 and the engine coolant sensor 12 cooperate with each other to form running condition detecting means. Outputs of the running condition detecting means 14 and the cylinder pressure sensor 13 are input to a control unit 20 which comprises a microcomputer, an electronic circuits and so forth. The control unit 20 calculates processing values, which are used for detecting and controlling knocking and combustion conditions in the internal combustion engine and to produce injection control signals Si, ignition control signals Sp and so forth.

Figure 2:
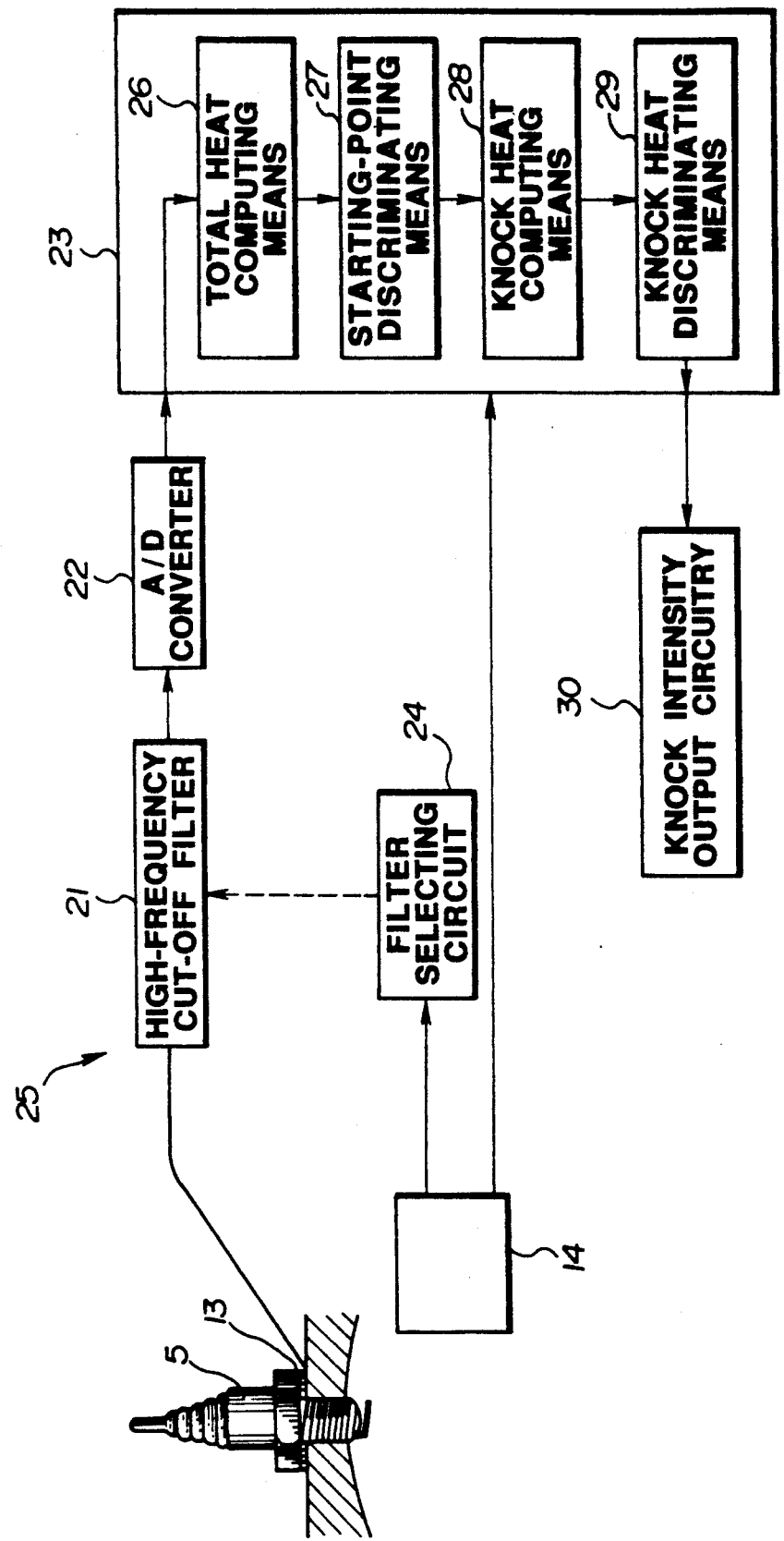
FIG. 2 is a block diagram of the first preferred embodiment of a knock detecting system for internal combustion engines, according to the present invention.
Figure 3:
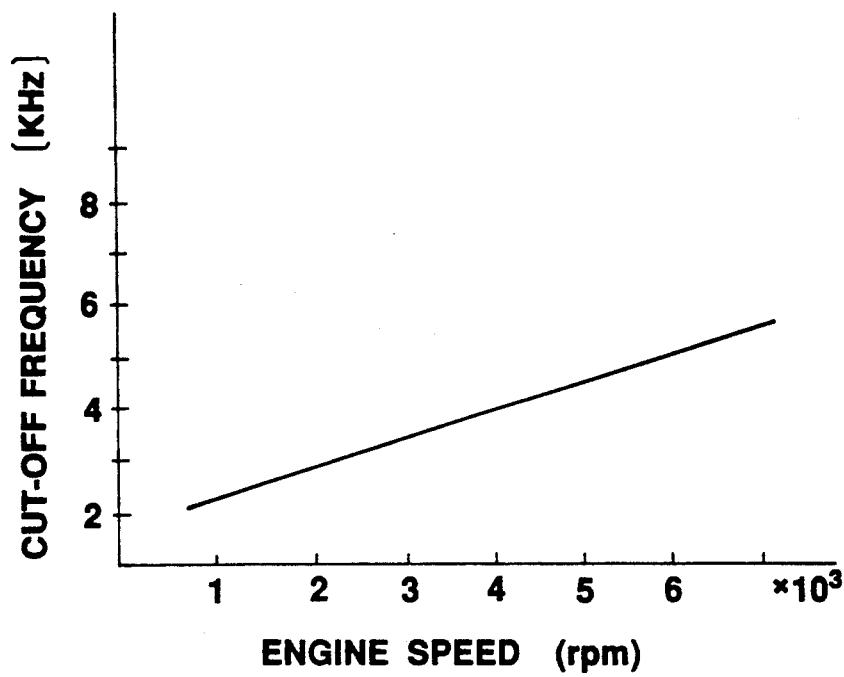
FIG. 3 is a graph showing a relationship between cut-off frequency and engine speed.

FIG. 2 shows the first preferred embodiment of a knock detecting system incorporated in the control unit 20, according to the present invention. As shown in FIG. 2, output signal of the cylinder pressure sensor 13 is input to a high-frequency cut-off filter 21. The high-frequency cut-off filter 21 removes high-frequency components higher than a predetermined frequency from the input signal. This effectively removes noise components from the input signal. The predetermined frequency will be referred to as a "cut-off frequency". As shown in FIG. 3, the cut-off frequency varies in proportion to the engine speed N. The engine speed N is derived on the basis of output from the running condition detecting means 14, specifically, of the crank angle sensor 10. On the basis of the derived engine speed N, a filter selecting circuit 24 selects the optimum cut-off frequency from the cut-off frequency characteristics shown in FIG. 3 to produce a signal representative of the optimum cut-off frequency. Then, the high-frequency cut-off filter 21 cuts off high-frequency components including the selected frequency band.

As the high-frequency cut-off filter 21, an analogue filter may be used. Such an analogue filter is made by combining devices which have a resistance depending on frequency. By forming the analogue filter so that a damping ratio of input signals depends on frequency, it may be designed to pass or cut off a selected frequency band. Such an analog filter include Bessel filters, Butterworth filters or the like. The high-frequency cut-off filter 21 and the filter selecting circuit 24 are cooperative with each other to form removing means 25.

After the high-frequency components are removed from the signal by means of the high-frequency cut-off filter 21, the signal is input to an A/D converter 22 which performs analog-to-digital conversion. Thereafter, this signal is input to knock intensity computing means 23.

The knock intensity computing means 23 also receives signals output from the running condition detecting means 14. The knock intensity computing means 23 comprises a heat quantity computing section 26 serving as total heat computing means, a knocking heat generation starting-point detecting section 27 serving as a starting-point discriminating means, a knock-portion heat quantity computing section 28 serving as knock heat computing means, and a knock intensity computing section 29 serving as knock intensity discriminating means. The knock heat computing section 26 derives total heat quantity produced in every engine cycle 1, on the basis of the running condition of the engine 1, from a pressure waveform fluctuation in which high-frequency components are removed from fluctuation in combustion pressure detected by the cylinder pressure sensor 13.

The knocking heat generation starting-point detecting section 27 determines the starting point of heat generation due to knocking in every engine cycle 1. The knock-portion heat quantity computing section 28 derives a heat quantity generated by knocking in every engine cycle 1. The knock intensity computing section 29 derives a ratio of the total heat quantity generated in engine cycle 1 to the heat quantity generated by knocking, and determines knock intensity on the basis of the aforementioned ratio. The output of the knock intensity computing section 29 is input to a knock intensity output circuit 30 which outputs a knock intensity indicative signal to a spark ignition timing control circuit (not shown) of the control unit 20. This knock intensity indicative signal is used for controlling knocking in the internal combustion engine. The knock intensity indicative signal can also be used as, for example, input data which are input to a knock intensity input device for detecting knocking.

The operation of the first preferred embodiment of a knock detecting system, according to the present invention, is described below.

Figure 4:
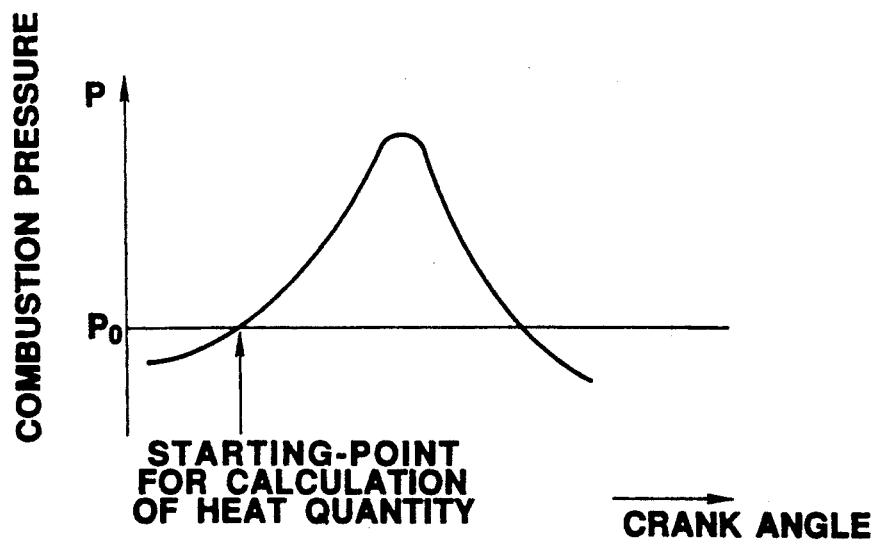
FIG. 4 is a graph showing the relationship between combustion pressure and crank angle, for explaining the starting-point for a calculation of heat quantity.

When the engine begins operation, combustion pressures in the combustion chambers of the respective cylinders vary, and the peak value of the combustion pressure appears at every cycle. In this case, as shown in FIG. 4, the calculation of heat quantity is started when the combustion pressure indicative signal value, in which high-frequency components are removed, becomes greater than PO (PO=func(Tp or Boost)) which is derived as a function of a basic fuel injection amount Tp, which is a negative intake pressure or an intake air amount.

The process for calculating heat quantity is described below.

Figure 5:
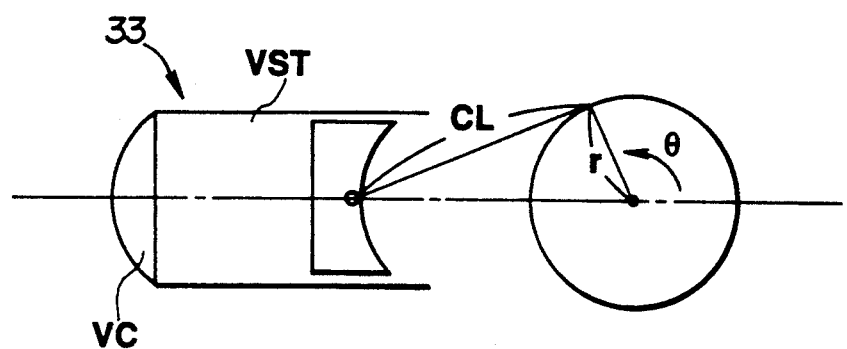
FIG. 5 is a view explaining the parameters required for calculating a compression ratio of a cylinder.

As shown in FIG. 5, if the stroke volume, the volume of combustion chamber, the length of connecting rod and the radius of the cylinder 31 are respectively expressed by VST, VC, CL and r, a compression ratio RC of the cylinder 31 may be expressed by the following formula.

$$RC = \frac{VC + VST}{VC} = \epsilon$$

From this formula, a virtual volume $V(\theta)$ at a crank angle $\epsilon$ may be expressed by the following formula.

$$V(\theta) = VST \times \left[ \frac{1}{rc - 1} + \frac{1 + \cos\theta}{2} + \frac{B}{2} \left\{ 1 - \sqrt{1 - (\sin\theta/B)^2} \right\} \right]$$

$$(B = 2CL/STL = 2CL/2r = CL/r)$$

Figure 6:
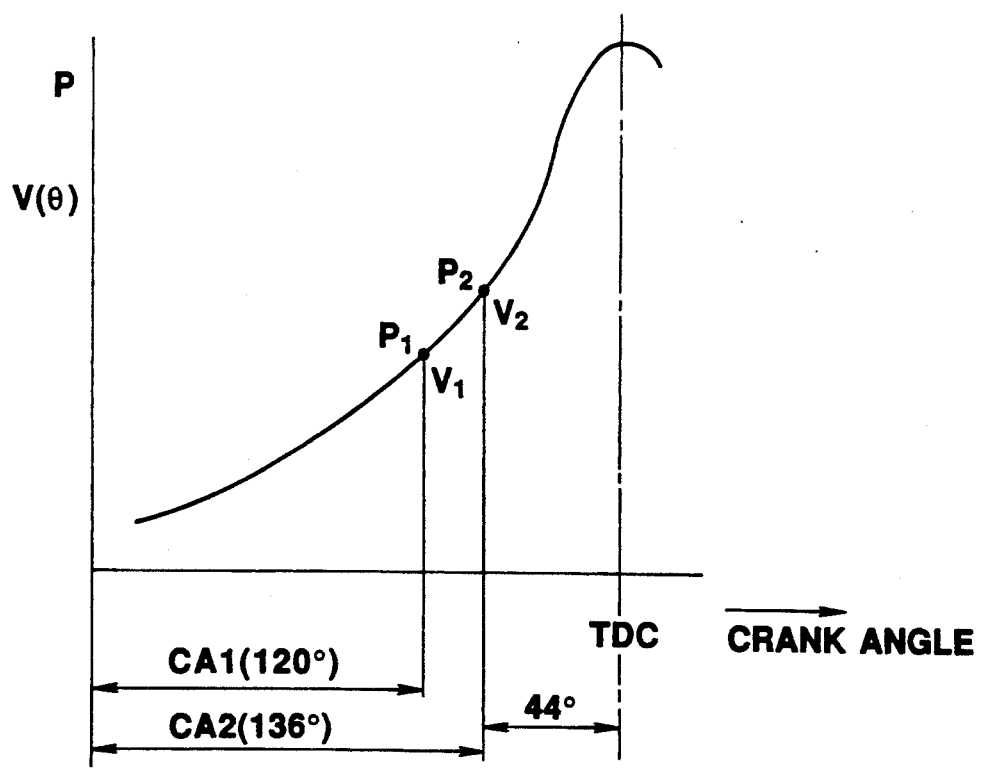
FIG. 6 is a graph showing compression pressure p and virtual volume $V(\theta)$ relative to crank angle.

As shown in FIG. 6, compression pressures $P_1$ and $P_2$ volumes $V_1$ and $V_2$ at 60° BTDC (before and 44° BTDC, respectively, are derived from waveform fluctuation in combustion pressure during the compression stroke. By using the values $P_1$, $P_2$, $V_1$ and $V_2$a polytropic exponent PN may be derived as follows.

$$PN = \frac{\ln P_2 - \ln P_1}{\ln V_1 - \ln V_2}$$

Figure 7A:
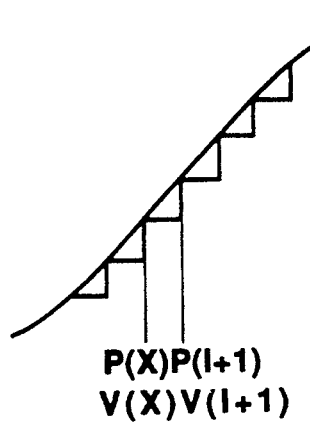
FIGS. 7(a) and 7(b) are graphs showing increase of compression pressure.
Figure 7B:
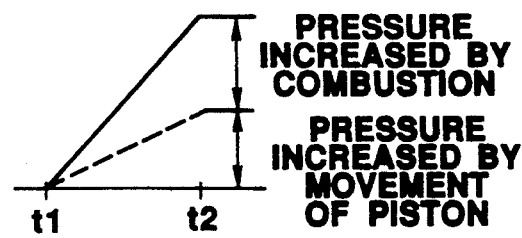

Practically, the combustion pressure P(I) and the volume V(I) are sequentially derived at every unit crank angle for deriving total generated heat quantity. As shown in FIG. 7(a), the calculations of combustion pressure P(I) and volume V(I) at every unit crank angle are performed by substituting P(I+1) and V(I+1) for P(I) and V(I) at next unit crank angle. As shown in FIG. 7(b), such a difference between pressures at the timing t1 (corresponding to I) and the timing t2 (corresponding to I+1) includes both pressure increases due to combustion in the combustion chamber and due to movement of the piston. Now, assuming that a coefficient $F_K$ used for deriving the heat quantity is:

$$F_K = Cv/R (\approx 0.33/29.13)$$

(Cv:isovolumic specific heat, R:gas constant)
and that the stroke volume at the compression starting-point is V(1)=VST, the total heat quantity $Q_A$ may be derived in accordance with the following formula.

$$Q_A = \sum_{I=1}^{N} F_K \times \left[ \{P(I + 1) - P(I)\} - \left( \left( \frac{V(I)}{V(I + 1)} \right) PN - 1 \right) \times P(I) \right] \times V(I)$$

Figure 8:
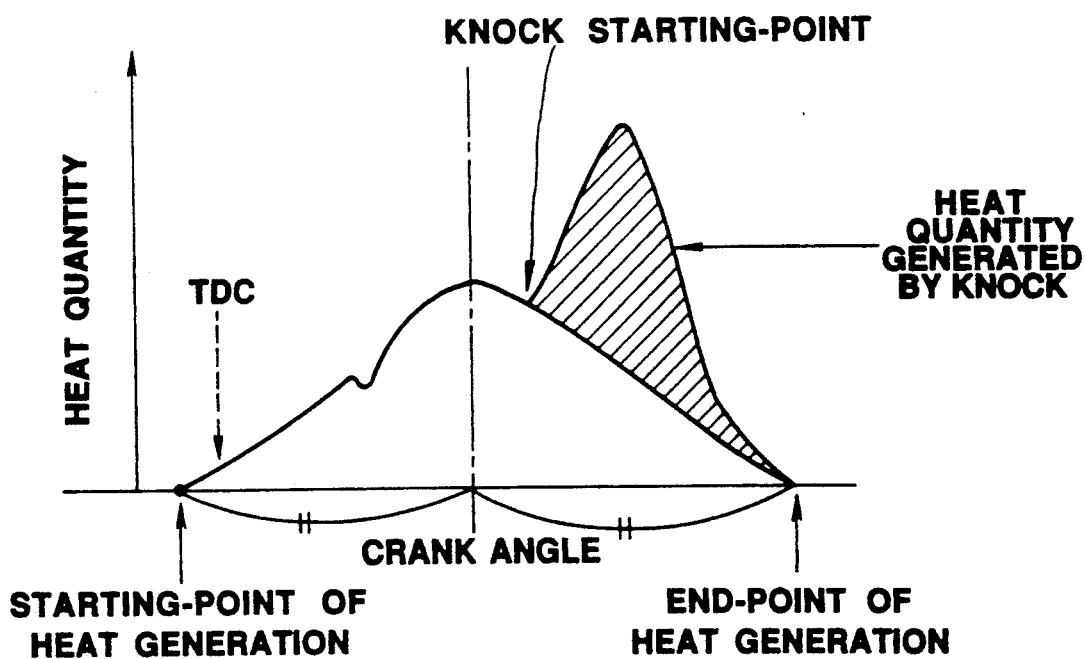
FIG. 8 is a graph showing a relationship between heat quantity and crank angle.

Next, a heat quantity $Q_B$ generated by knocking is calculated. In FIG. 8, the heat generated due to knocking is shown by hatching. In this case, an inflection point of the line indicating the generated heat quantity relative to crank angle, which is a point after the middle point between the start and end-points of heat generation, or a point after top dead-center (or the spark ignition timing point), is used to indicate the starting-point of heat generation due to knocking (knock starting-point). If the knock starting-point is defined in this manner, the starting-point best suited to actual combustion conditions can be accurately determined. On the other hand, a point at which the generated heat quantity becomes zero is used to indicate the end-point of heat generation due to knocking (knock end-point). The determined heat quantity $Q_B$ generated by knocking is indicated by a hatched portion (in FIG. 8) which exceeds a straight line drawn between the knock starting-point and the knock end-point.

After the generated heat quantities $Q_A$ and $Q_B$ are derived in the aforementioned manner, the knock intensity computing section 29 derives a ratio S of the heat quantity $Q_B$ generated by knocking to the total generated heat quantity $Q_A$, which is expressed by the following formula.

$$S = \frac{Q_B}{Q_A}$$

On the basis of the ratio S, the knock intensity is determined. In this embodiment, knocking is detected on the basis of variation of the generated heat quantity relative to crank angle, unlike conventional knock detecting processes, in which knocking is detected by assigning numerical values to intensities of fluctuation in cylinder pressure. Therefore, it is possible to accurately detect knocking regardless of the sort of engine, a mounting position of cylinder pressure sensors, a difference between outputs of individual sensors and so forth, without changing the detection logic.

In addition, since high-frequency components of fluctuation in cylinder pressure are used for knock detection, it is possible to remarkably improve the accuracy in knock detection without influence of noise components produced by vibration of the engine. Specifically, if the high-frequency components are increased when the engine drives at high revolutions, normal knock components can be separated from the detected heat quantity so that the detection accuracy can be improved. As a result, it is possible to decrease the man-hours and costs required for developing knock detection logic.

Though the ratio S is calculated by using the total generated heat quantity $Q_A$ as a denominator of the fraction in the aforementioned embodiment, it may also be calculated by using, for example, a heat quantity $(Q_A - Q_B)$ generated by normal combustion as the denominator as follows.

$$S = \frac{Q_B}{Q_A - Q_B}$$

Figure 9:
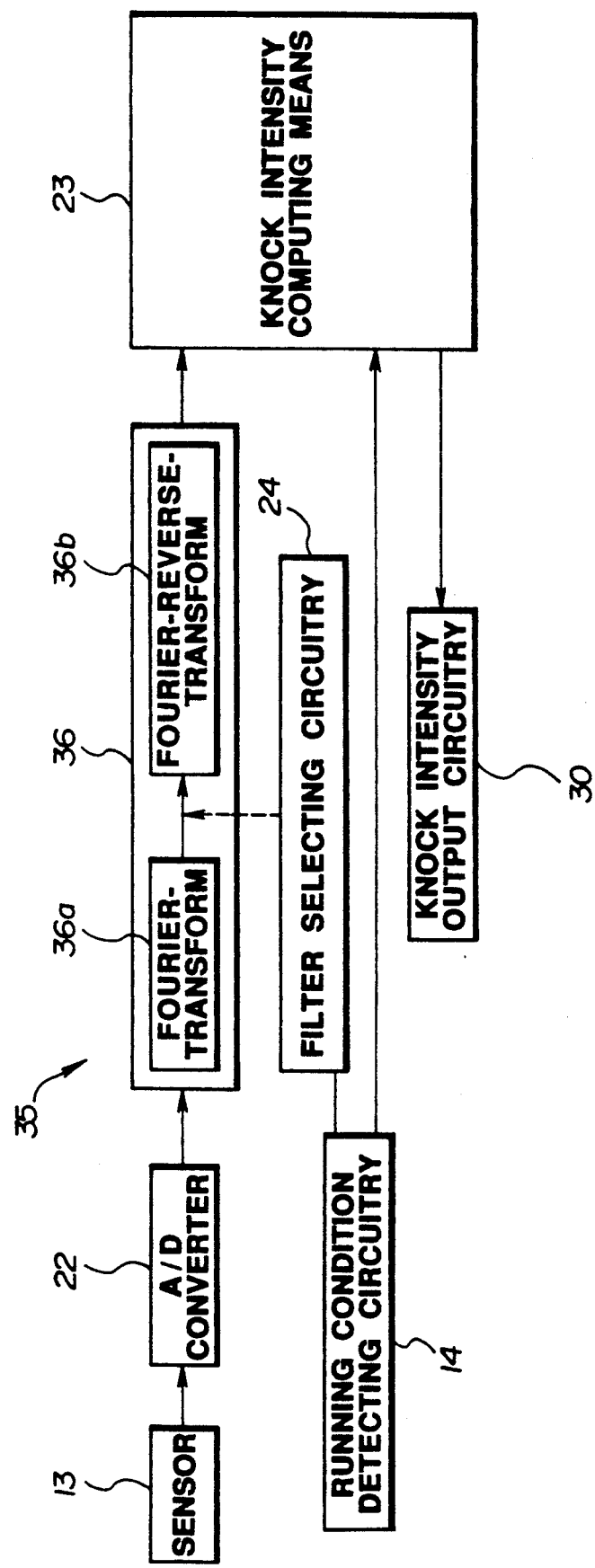
FIG. 9 is a block diagram of the second preferred embodiment of a knock detecting system for internal combustion engines, according to the present invention.

FIG. 9 shows the second preferred embodiment of a knock detecting system according to the present invention. In this embodiment, removing means 35 differs from that of the first preferred embodiment. That is, the removing means 35 comprises a high-frequency cut-off filter 36 including Fourier-transform circuitry 36a and Fourier-reverse-transform circuitry 36b, and a filter selecting circuit 24. The A/D converter 22 is arranged between the cylinder pressure sensor 13 and the high-frequency cut-off filter 36. The high-frequency cut-off filter 36 expands an input signal that A/D conversion was performed by the A/D converter 22, to get a Fourier series. This Fourier series is a polynomial, the respective terms of which correspond to the respective frequencies. From these terms of the polynomial, terms corresponding to frequency bands which are to be cut off are removed, to derive a new polynomial. On the basis of this new polynomial, a signal is produced again. In this way, only selected frequency bands are passed or cut off. With this embodiment, the same effect as that of the first preferred embodiment is obtained.

FIGS. 10 to 13 show the third preferred embodiment of a knock detecting system, according to the present invention. This embodiment is characterized by a process for detecting a knock starting-point.

Figure 10:
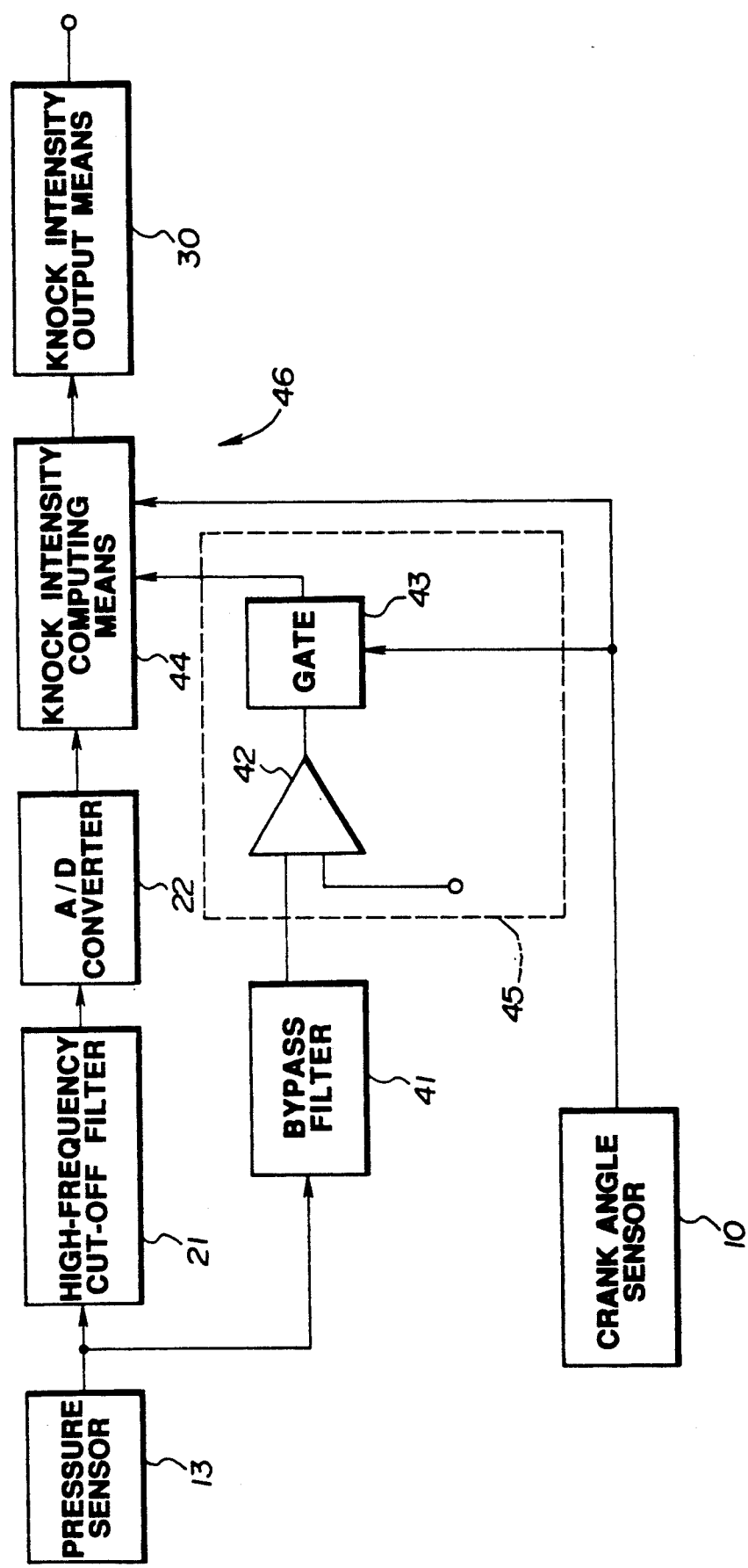
FIG. 10 is a block diagram of the third preferred embodiment of a knock detecting system for internal combustion engines, according to the present invention.

In FIG. 10, the output of the cylinder pressure sensor 13 branches to be input not only to the high-frequency cut-off filter, but also to a bypass filter 41. The bypass filter 41 allows only predetermined high-frequency components of a pressure fluctuation indicative signal to pass therethrough to be output to one input terminal of a comparator 42. The other input terminal of the comparator 42 receives a predetermined reference value. When the high-frequency component of the pressure fluctuation indicative signal exceeds to the reference value, the comparator 42 outputs an "H" level signal to a gate 43. When the output of the comparator 42 is "H" level, the gate 43 reads the crank angle detected by the crank angle sensor 10 to output a synchronizing signal, which is used for determining if a knock detecting flag FKN is set, to a knock intensity computing means 44. In this embodiment, in response to this synchronizing signal, the knock intensity computing means 44 performs a process for setting the knock detecting flag FKN in addition to the process performed in the first preferred embodiment. A start-timing setting means 45 is formed by the comparator 42 and the gate 43. In this embodiment, the bypass filter 41, the start-timing setting means 45 and the knocking heat generation starting-point detecting section 27 of the knock intensity computing means 44 are cooperative with each other to serve as starting-point discriminating means 46. Otherwise the construction is similar to that of the first preferred embodiment.

The operation of the third preferred embodiment of a knock detecting system, according to the present invention is described below.

Figure 11:
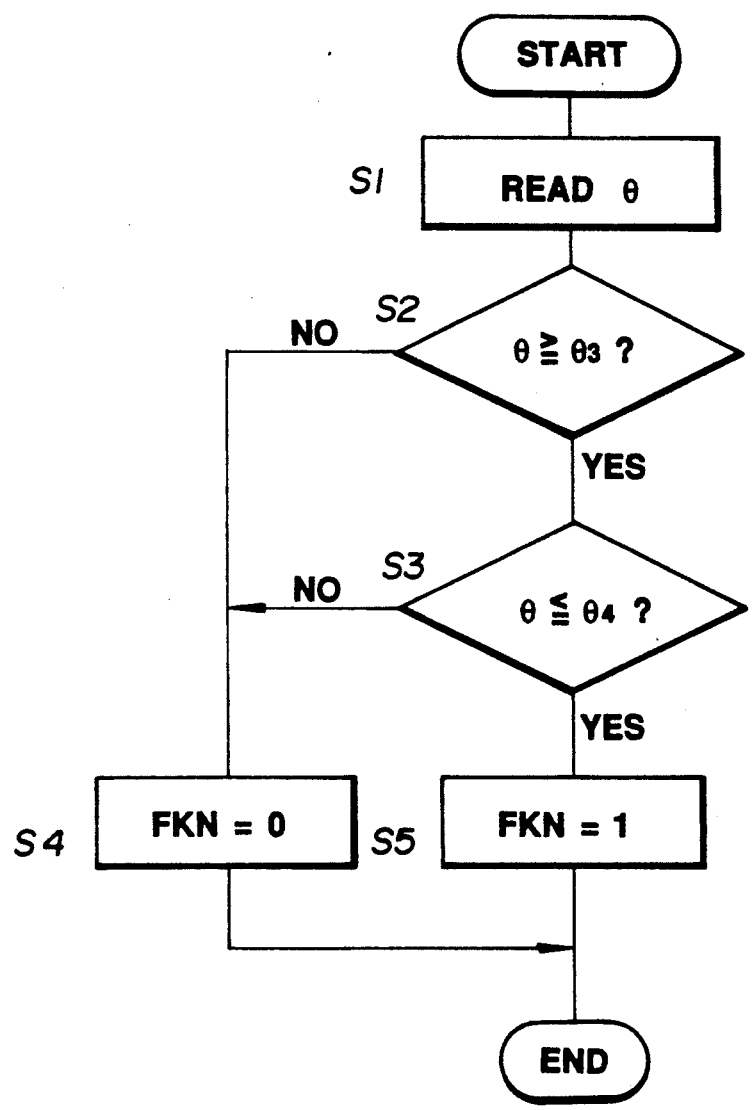
FIG. 11 is a flow chart of a program for processing a knock detecting flag in the knock detecting system of FIG. 10.

FIG. 11 is a flow chart of a program for processing the knock detecting flag FKN, which is executed at a timing when the output of the gate 43 becomes "H" level.

Figure 12:
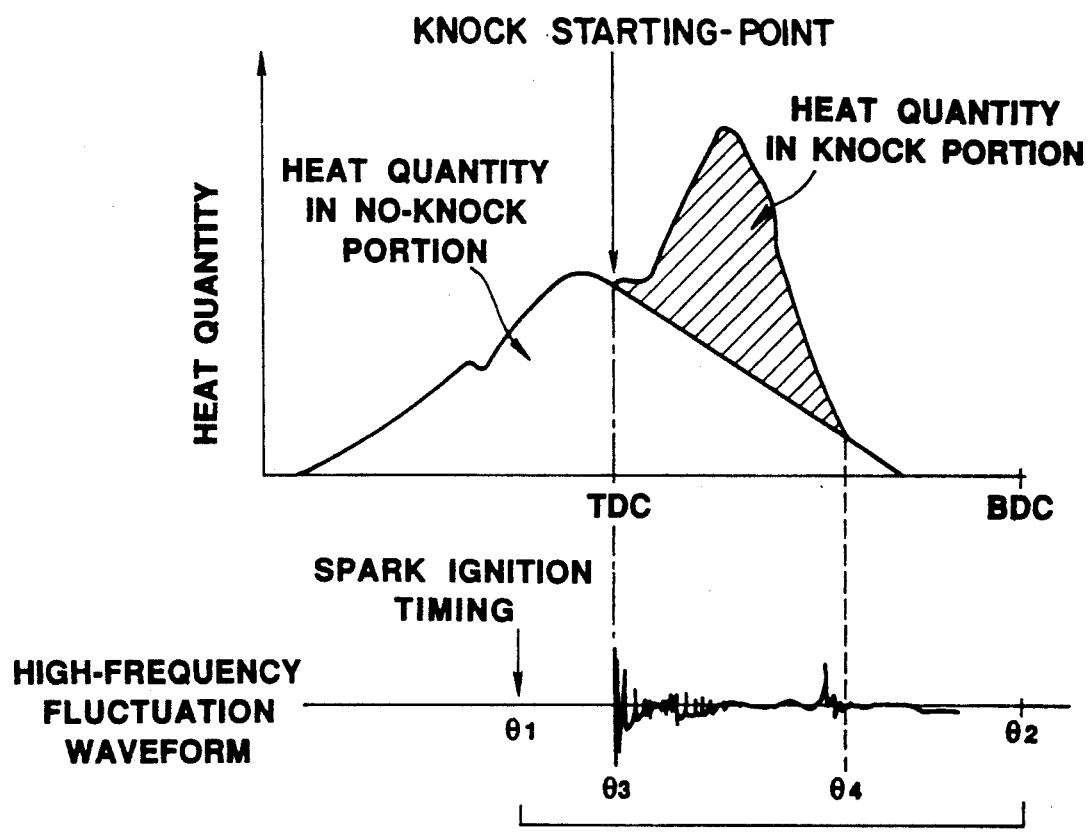
FIG. 12 is a graph showing heat quantity and high-frequency waveform fluctuation relative to crank angle.

First of all, at step 1, the current crank angle $\theta$ is read at step 1. Then, at step 2, the crank angle $\theta$ is compared with a predetermined angle $\theta 3$ which is preset to, for example, near TDC (top-dead-center). When $\theta \geq \theta 3$, the routine goes to step 3 in which the crank angle $\theta$ is compared with a predetermined angle $\theta 4$ which is preset to, for example, 50° ATDC (after top-dead-center). The inventors have found through experiment that the fluctuation component of the cylinder pressure sensor 13, specifically the high-frequency waveform fluctuation, varies rapidly at a crank angle in which knocking starts to occur, as shown in FIG. 12. This means that knocking tends to occur when the crank angle exists between near TDC and 50° ATDC. For that reason, $\theta 3$ and $\theta 4$ is set to near TDC and 50°, respectively. Therefore, when the crank angle $\theta$ exists between $\theta 3$ and $\theta 4$, it is determined that knocking occurs, and the routine goes from step 3 to step 5 in which the knock detecting flag FKN is set to "1". On the other hand, when the crank angle $\theta$ does not exist between $\theta 3$ and $\theta 4$, the knock detecting flag FKN is reset to "0" at step 4, and the routine ends.

Figure 13:
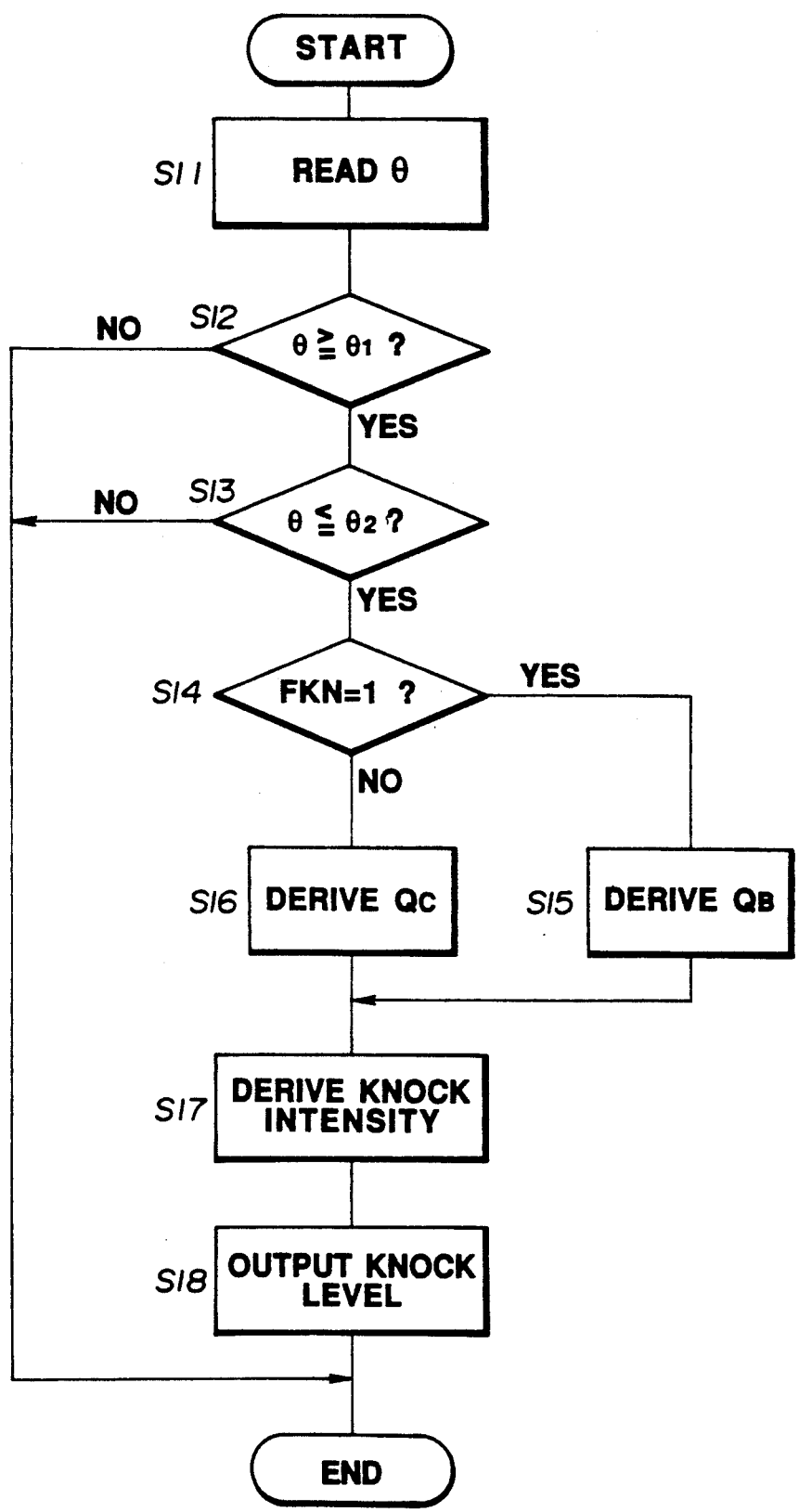
FIG. 13 is a flow chart of a program for determining knock intensity in the knock detecting system of FIG. 10.

FIG. 13 is a flow chart of a program for determining knock intensity, which is executed at every unit crank angle, e.g. every 1°.

At step 11, the current crank angle $\theta$ is read, and at step 12, the current crank angle $\theta$ is compared with a predetermined angle $\theta 1$ which is set to a crank angle corresponding to the spark ignition timing as shown in FIG. 12. When $\theta \geq \theta 1$, the routine goes to step 13 in which the crank angle $\theta$ is compared with a predetermined angle $\theta 2$ which is set to bottom-dead-center BDC as shown in FIG. 12. The reason why the angles $\theta 1$ and $\theta 2$ are set as aforementioned is that the crank angle corresponding to the knock starting-point always exists between the spark-ignited crank angle and BDC. Therefore, when the current crank angle $\theta$ exists between $\theta 1$ and $\theta 2$, the routine goes to step 14 in which it is determined whether or not the knock detecting flag FKN is set to "1". On the other hand, when a knock starting-point does not exist between $\theta 1$ and $\theta 2$, the routine ends. When FKN=1 is determined at step 14, which means that knocking occurs to produce heat, the routine goes to step 15 in which the heat quantity $Q_B$ generated in the knock portion (the hatched portion in FIG. 12) is derived. On the other hand, when FKN=0, the routine goes to step 16 in which a heat quantity $Q_C$ generated in no-knocking portion, i.e. a heat quantity generated in a portion other than the knock portion, is derived. The heat quantity $Q_C$ can be obtained by subtracting the heat quantity $Q_B$ generated in the knock portion from the total heat quantity $Q_A$. Then, at step 17, the ratio S of the heat quantities $Q_B$ and $Q_C$, which is used for determining knock intensity, is derived as follows.

$$S = \frac{Q_B}{Q_C}$$

At step 18, the knock level is determined and a knock intensity indicative signal corresponding to the knock level is output.

In this embodiment, predetermined high-frequency components are extracted from the pressure waveform indicating fluctuation in the combustion chamber, and then a crank angle, at which high-frequency fluctuation starts, is used as the knock starting-point. Therefore, the heat quantity $Q_B$ generated in the knock portion can be more accurately derived than in the first and second preferred embodiments, and there is an advantage in that the accuracy in knock detection can be further improved.

Figure 14:
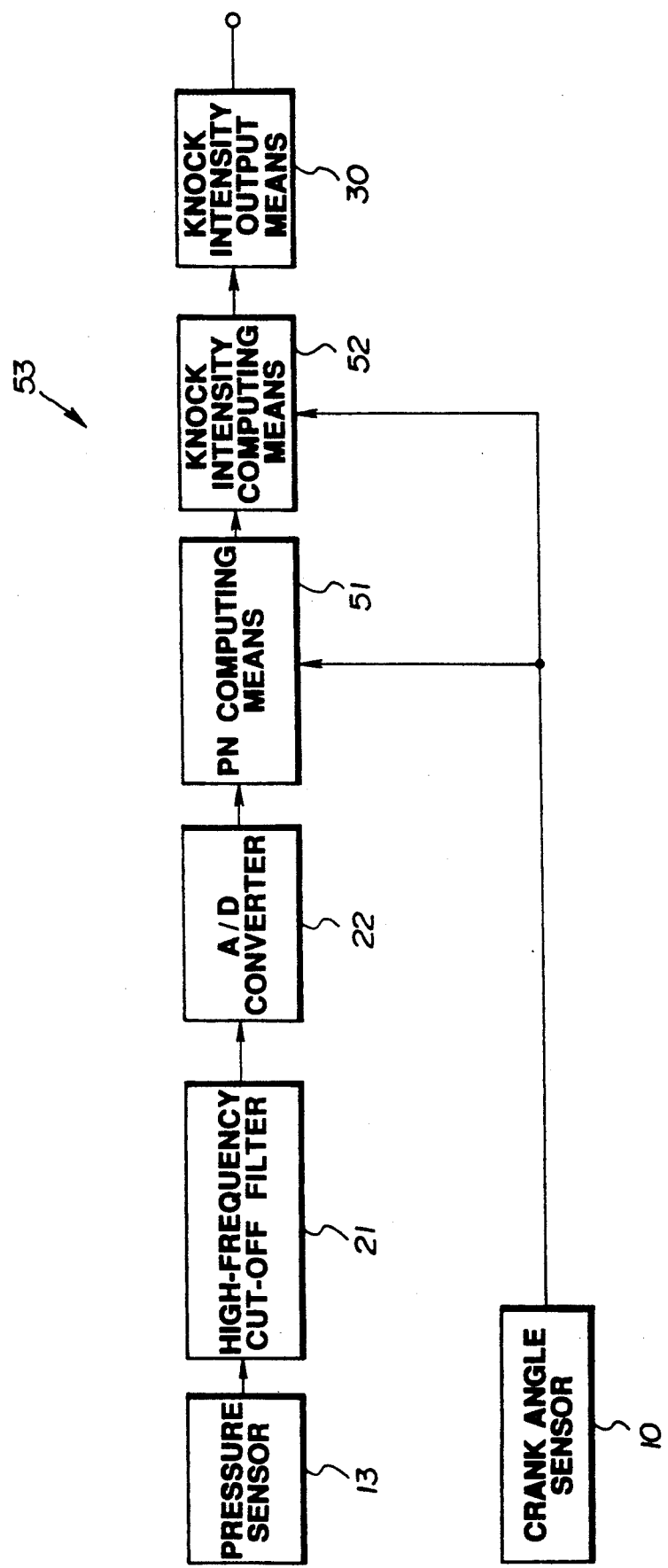
FIG. 14 is a block diagram of the fourth preferred embodiment of a knock detecting system for internal combustion engine, according to the present invention.
Figure 15:
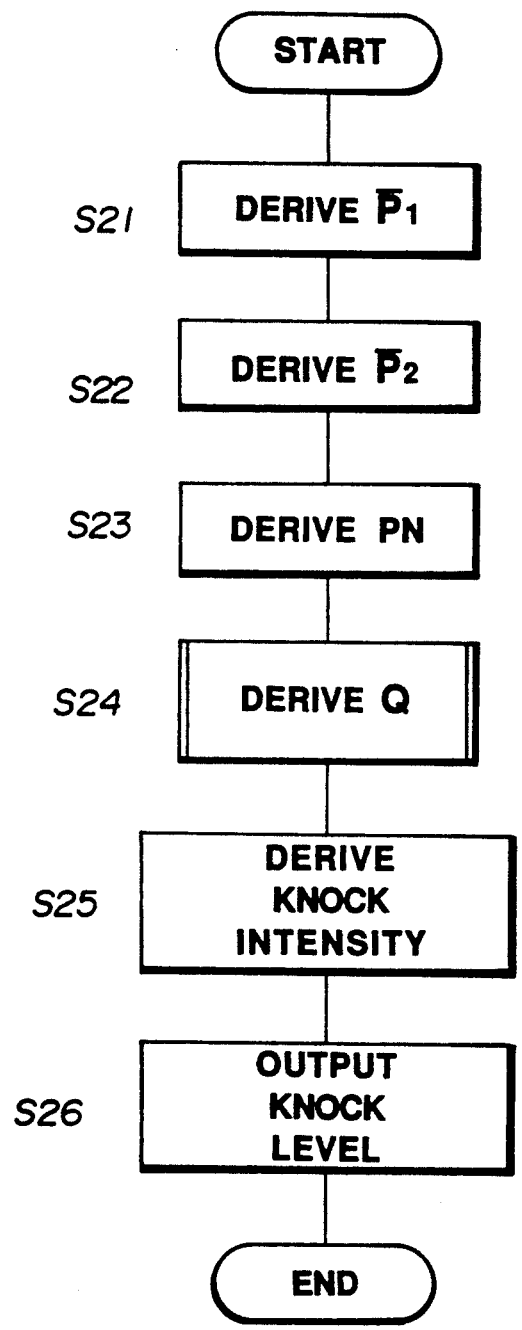
FIG. 15 is a flow chart of a program for determining knock intensity in the knock detecting system of FIG. 14.
Figure 16:
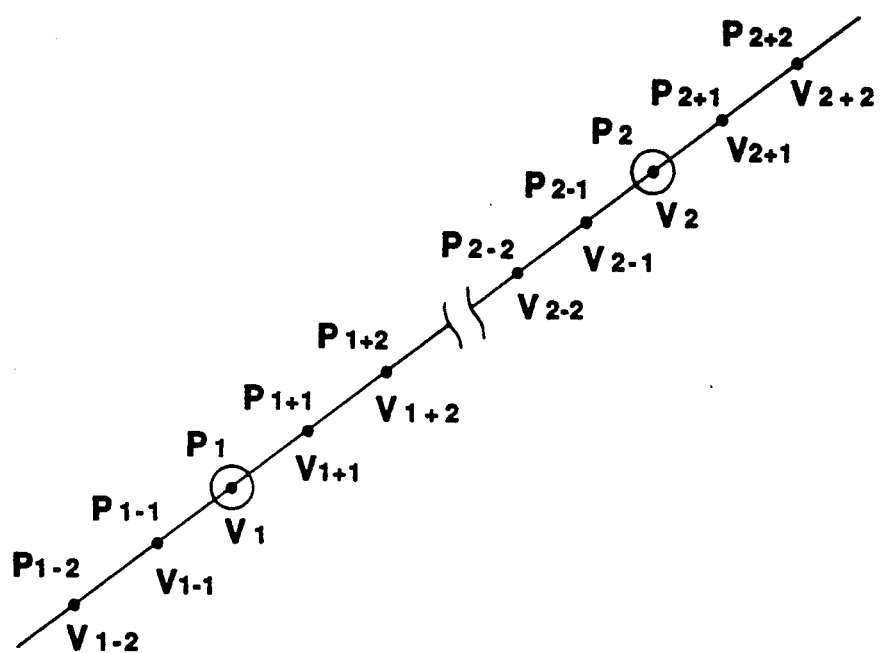
FIG. 16 is a graph showing a cylinder pressure waveform relative to crank angle.

FIGS. 14 to 16 show the fourth preferred embodiment of a knock detecting system according to the present invention. This embodiment is characterized by a process for calculating a polytropic exponent.

FIG. 14 is a block diagram showing a main portion of the fourth preferred embodiment of a knock detecting system according to the present invention. In this embodiment, output of the A/D converter 22 is input to a polytropic exponent computing means 51. The polytropic exponent computing means 51 calculates a polytropic exponent from fluctuation in cylinder pressure during a compression stroke at every cycle on the basis of output of the crank angle sensor 10. It then outputs the results to a knock intensity computing means 52. The knock intensity computing means 52 not only performs processes similar to that of the first preferred embodiment, but also calculates generated heat quantities by using the polytropic exponent calculated by the polytropic exponent computing means 51. In this embodiment, the total heat quantity computing means 53 is formed by the polytropic exponent computing means 51 and the knock heat quantity computing section 26 of the knock intensity computing means 52.

In practice, in the case of the first preferred embodiment, combustion pressures must be detected for some hundreds of cycles to average the detected combustion pressures in order to calculate the polytropic exponent and heat quantities. In this process, the polytropic exponent is calculated at a predetermined crank angle. Thus, if the combustion pressure at the predetermined crank angle is subjected to, for example, small noise or fluctuation in the cylinder pressure indicative signal, it is understood that a dispersion occurs in the calculated values so that accuracy in knock detection is decreased. Therefore, in the present embodiment the polytropic exponent is calculated at every cycle, and a mean value of the cylinder pressure values detected before and after a predetermined crank angle is obtained. In this way, the accuracy in calculation of the polytropic exponent can be enhanced, so that the heat quantities can be accurately calculated.

FIG. 15 is a flow chart of a program for determining knock intensity. This program is executed at every predetermined crank angle which is, e.g. a crank angle at which one combustion cycle ends.

At step 21, a mean value $\bar{P}_1$ of cylinder pressure $P_1$ at a first predetermined crank angle is calculated in accordance with the following formula.

$$\bar{P}_1 = \frac{1}{N}(P_{1-N} + \ldots + P_{1-l} + P_1 + P_{1+l} + \ldots P_{1+N})$$

$(1 - N \sim 1 + N$: crank angles in compression stroke)

Then, at step 22, a mean value of cylinder pressure $P_2$ at a second predetermined crank angle is calculated in accordance with the following formula.

$$\bar{P}_2 = \frac{1}{N}(P_{2-N} + \ldots + P_{2-l} + P_2 + P_{2+l} + \ldots P_{2+N})$$

$(2 - N \sim 2 + N$: crank angles in compression stroke)

The relationship between each of the crank angles in steps 21 and 22, and the cylinder pressure waveform is shown in FIG. 16. Next, at step 23, the polytropic exponent $\overline{PN}$ is calculated in accordance with the following formula.

$$\overline{PN} = \frac{\ln \bar{P}_2 - \ln \bar{P}_1}{\ln V_1 - \ln V_2}$$

Then, at step 24, the heat quantities in one cycle are calculated by using the polytropic exponent calculated by the aforementioned formula in accordance with a formula similar to that of the first preferred embodiment, and at step 25, the knock intensity is calculated. Finally, at step 26, the knock intensity indicative signal is output, and the routine ends.

In this embodiment, mean values of the cylinder pressure values detected before and after the predetermined first and second crank angles are obtained, and the polytropic exponent is calculated at every cycle by using the obtained means values. In this way, influence by noise and fluctuation in the cylinder pressure indicative signal can be decreased, so that the accuracy in calculation of the generated heat quantities can be enhanced, thereby the accuracy of knock detection can be improved still further.

Figure 17:
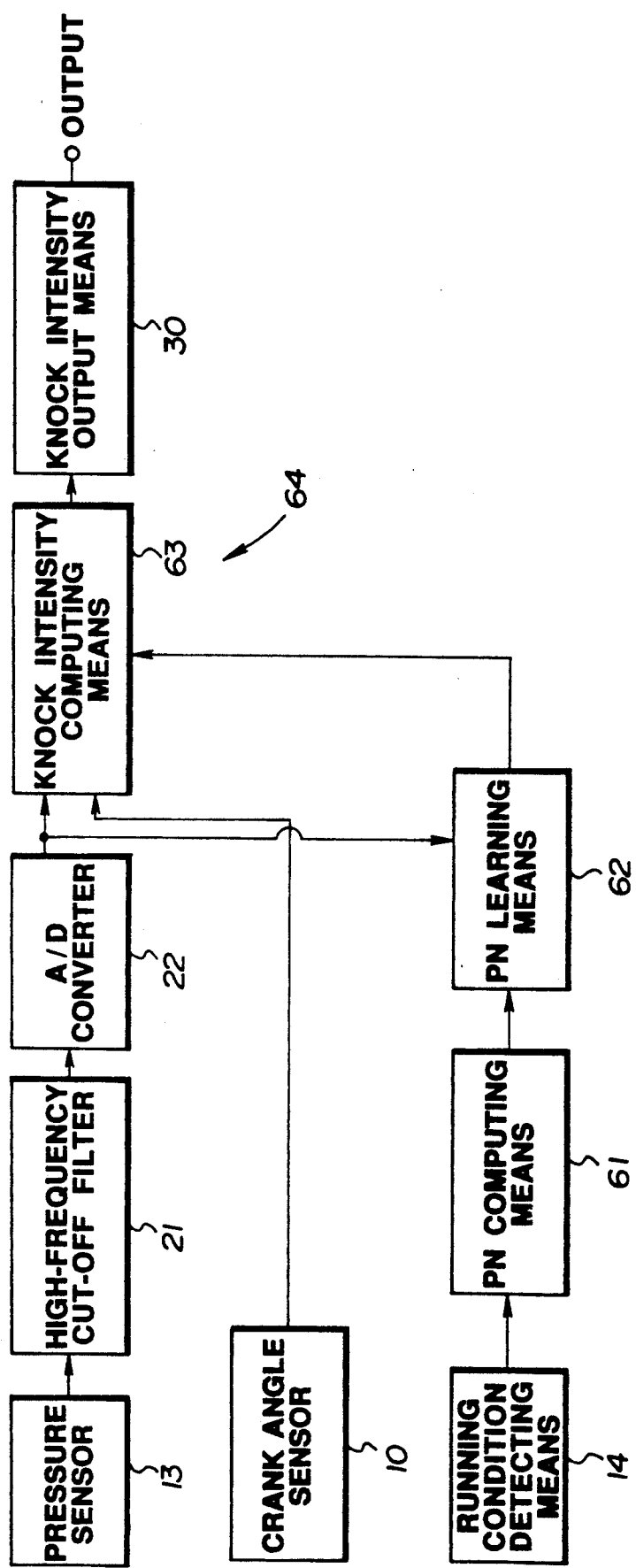
FIG. 17 is a block diagram of the fifth preferred embodiment of a knock detecting system for internal combustion engines, according to the present invention.
Figure 18:
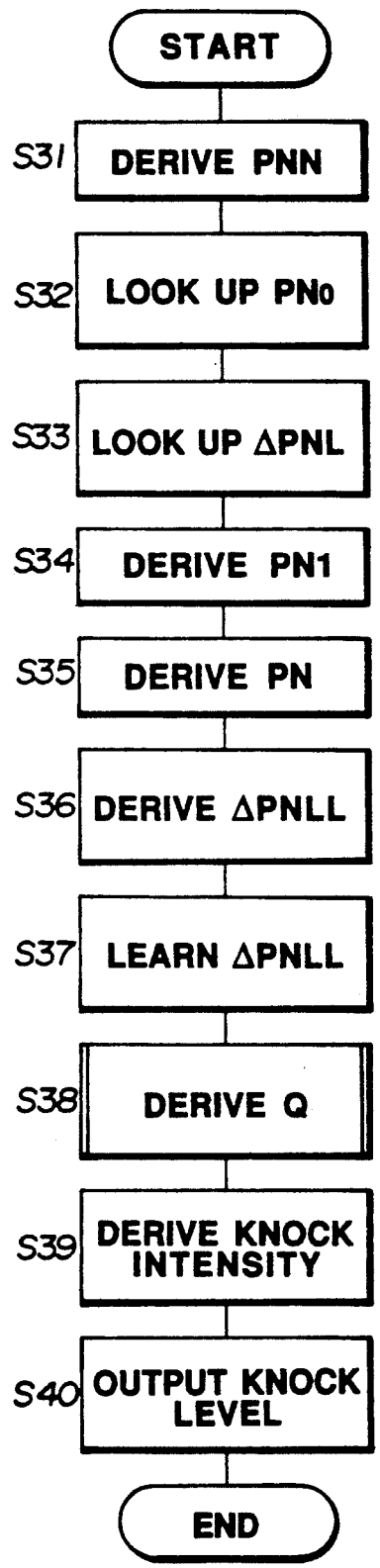
FIG. 18 is a flow chart of a program for determining knock intensity in the knock detecting system of FIG. 17.

FIGS. 17 and 18 show the fifth preferred embodiment of a knock detecting system, according to the present invention. In this embodiment, a learning value is used for calculating the polytropic exponent. As shown in FIG. 17, an output from the running condition detecting means 14 is input to a polytropic exponent computing means 61. The polytropic exponent computing means 61 calculates the polytropic exponent on the basis of the engine load (the intake air amount) and the engine speed, to output the calculated value to a polytropic exponent learning circuit 62. The polytropic exponent learning circuit 62 learns and stores the input polytropic exponent.

A knock intensity computing means 63 performs not only processes similar to that of the first preferred embodiment, but also calculates generated heat quantities by using the learning value of the polytropic exponent learning circuit 62 as the polytropic exponent. In this embodiment, the polytropic exponent computing means 61, the polytropic exponent learning circuit 62 and the generated heat quantity computing section 26 of the knock intensity computing means 63 are cooperative with each other to form total heat quantity computing means 63. Other constructions are similar to that of the first preferred embodiment.

FIG. 18 is a flow chart of a program for determining the knock intensity.

At step 31, a polytropic exponent PNN is calculated at every cycle in accordance with the following formula.

$$PNN = \frac{\ln P_2 - \ln P_1}{\ln V_1 - \ln V_2}$$

Then, at step 32, the reference value $PN_0$ of the polytropic exponent corresponding to the current running condition is looked up from a map table in which the reference values $PN_0$ are classified for every running condition, using engine load and engine speed as parameters. As the reference values $PN_0$, the optimum values are previously stored on the basis of experiment or the like. Thereafter, at step 33, the learning correction value $\Delta PNL$ of the polytropic exponent is looked up from a table map, the parameters of which are the engine load and engine speed. This learning correction value $\Delta PNL$ is used for correcting the reference value $PN_0$ on the basis of the current running condition, circumference condition and so forth. Then, at step 34, the learning polytropic exponent PN1 is calculated in accordance with the following formula.

$$PN1 = PN_0 + \Delta PNL.$$

Next, at step 35, the current polytropic exponent PN is calculated in accordance with the following formula.

$$PN = \frac{n-a}{n} \times PN1 + \frac{a}{n} \times PNN$$

($a$: reflecting proportion $(0 < a < n)$, $n$: constant)

According to the aforementioned calculation, the polytropic exponent PN is derived from the actual detected value PNN and the learning value PN1. In this way, it is possible to smoothly calculate the polytropic exponent by learning even if the circumference condition varies, so that the accuracy in the calculation of the polytropic exponent can be remarkably improved. Thereafter, at step 36, the learning correction stored value ΔPNLL is calculated in accordance with the following formula:

ΔPNLL=PN−PN1.

At step 37, this calculated value is stored in the ΔPNL learning table as the learning result. Then, at step 38, the heat quantities in one cycle are calculated by using the current polytropic exponent PN calculated by the aforementioned formula, in accordance with a formula similar to that of the first preferred embodiment. At step 39, the knock intensity is calculated. Finally, at step 40, the knock intensity indicative signal is output, and the routine ends.

In this embodiment, since the learning value is used for calculating the polytropic exponent PN, various effects are obtained due to the so-called learning process. For example, high reliability and accuracy of calculated values as well as high speed calculation characteristics and so forth can be obtained. This means considerable improvement in all aspects of a knock-detection system.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modification to the shown embodiments which can be embodied without departing from the principle of the inventions as set forth in the appended claims.

What is claimed is:

1. In an internal combustion engine having an engine cylinder defining a combustion chamber:

pressure detecting means for monitoring fluctuations in pressure within the combustion chamber of the engine cylinder of the internal combustion engine and generating a first signal indicative of said monitored fluctuations;

removing means for removing high-frequency components having frequencies higher than a predetermined cut-off frequency from said first signal and generating a second signal, wherein said high-frequency components from said first signal are removed;

running condition detecting means for monitoring a running condition of the internal combustion engine and generating a third signal indicative of said monitored running condition;

total heat quantity computing means for deriving a total heat quantity produced in every engine cycle, on the basis of said second and third signals;

knock heat quantity computing means for deriving a knock heat quantity generated in every engine cycle, on the basis of said second and third signals;

knock intensity determining means for determining knock intensity on the basis of a predetermined relationship between said knock heat quantity and said total heat quantity and generating an output signal indicative of said determined knock intensity;

means for generating an ignition control signal on the basis of said output signal; and means, including a spark plug, for generating an electric discharge in response to said ignition control signal.

2. An internal combustion engine as set forth in claim 1, wherein said knock intensity determining means derives a ratio of said knock heat quantity to said total heat quantity to determine knock intensity on the basis of said ratio.

3. An internal combustion engine as set forth in claim 1, wherein said knock intensity determining means derives a ratio of said knock heat quantity to a normal combustion heat quantity generated by normal combustion, to determine knock intensity on the basis of said ratio, said normal combustion heat quantity being obtained by subtracting said knock heat quantity from said total heat quantity.

4. An internal combustion engine as set forth in claim 1, wherein said running condition detecting means includes crank angle detecting means for monitoring an angular position of a crankshaft of the engine to produce a crank angle indicative signal.

5. An internal combustion engine as set forth in claim 4, wherein a setting means sets a knock starting-point at which heat by knocking starts to be produced, and a knock endpoint at which heat ceases to be produced by knocking.

6. An internal combustion engine as set forth in claim 5, wherein said knock starting-point is an inflection point of said total heat quantity relative to the angular position of the crankshaft, and said knock end-point is a point in which said total heat quantity becomes zero.

7. An internal combustion engine as set forth in claim 5, wherein the angular position of the crankshaft at said knock starting-point is near top-dead-center, and the angular position thereof at said knock end-point is 50° after top-dead-center.

8. An internal combustion engine as set forth in claim 1, wherein said pressure detecting means is a cylinder pressure sensor.

9. An internal combustion engine as set forth in claim 4, wherein said predetermined cut-off frequency is set so as to vary in proportion to engine speed which is derived on the basis of said angular position of the crankshaft.

10. An internal combustion engine as set forth in claim 9, wherein said removing means includes a filter selecting means which selects the optimum cut-off frequency on the basis of said angular position, and a high-frequency cut-off filter which cuts off high-frequency components having frequencies higher than said selecting cut-off frequency.

* * * * *